L. S. UHLER.
MOTION PICTURE CAMERA.
APPLICATION FILED JAN. 19, 1920.
1,409,980.
Patented Mar. 21, 1922.
4 SHEETS—SHEET 2.
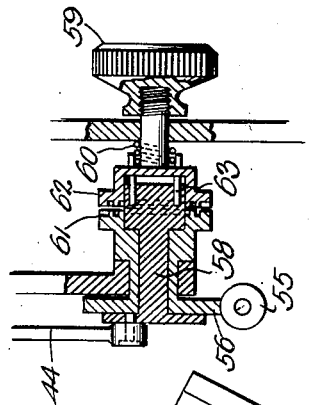
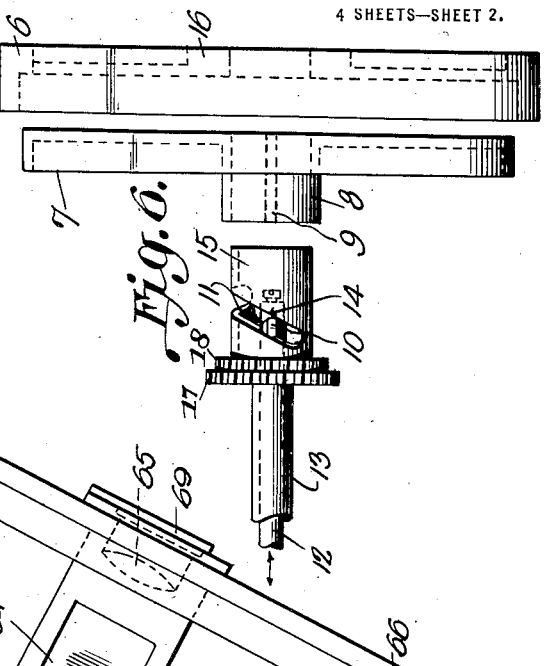
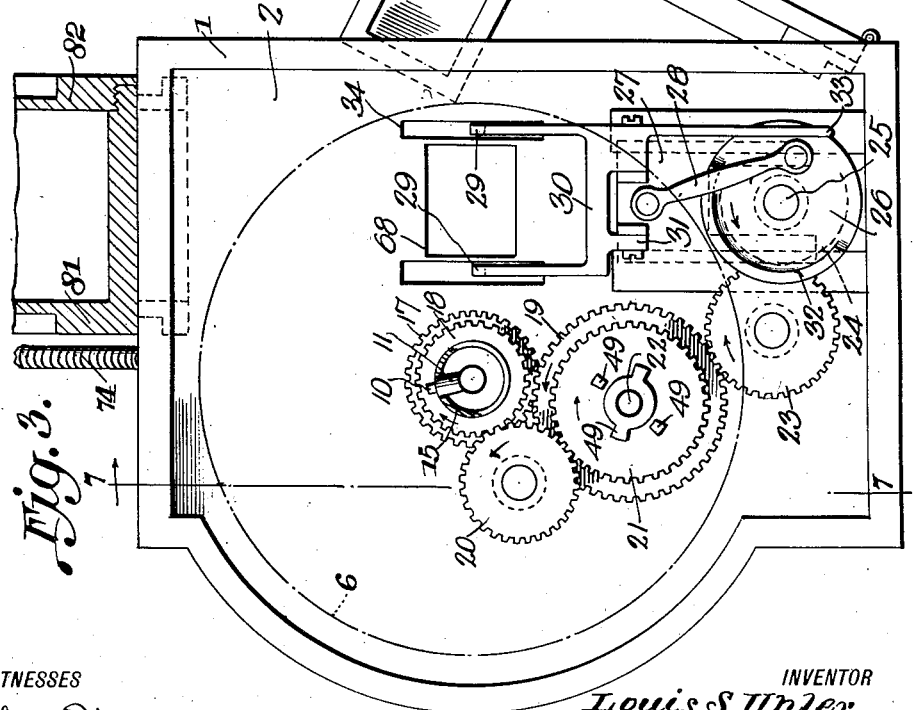
WITNESSES
INVENTOR
Louis S. Uhler
BY
ATTORNEYS

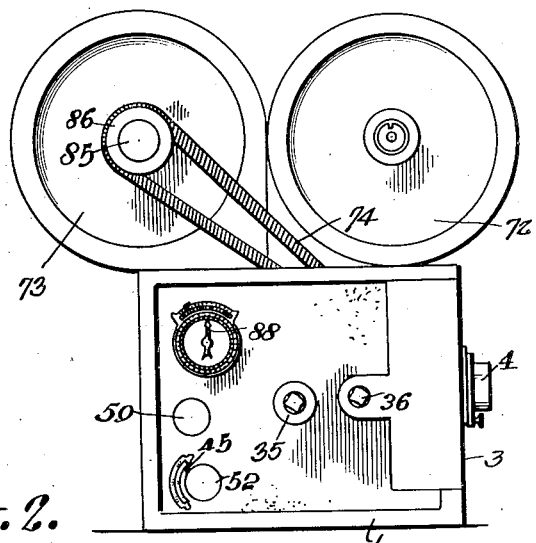
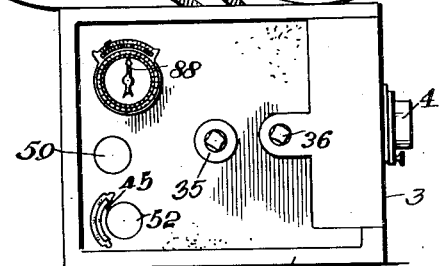
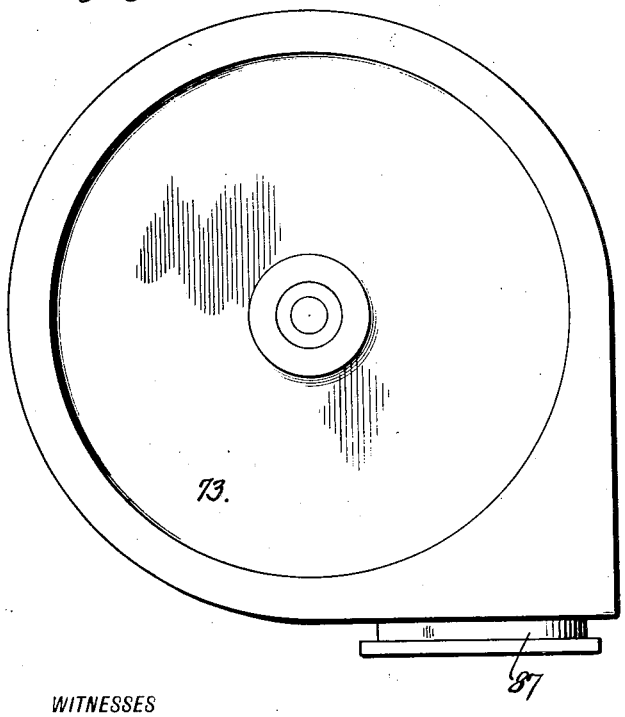
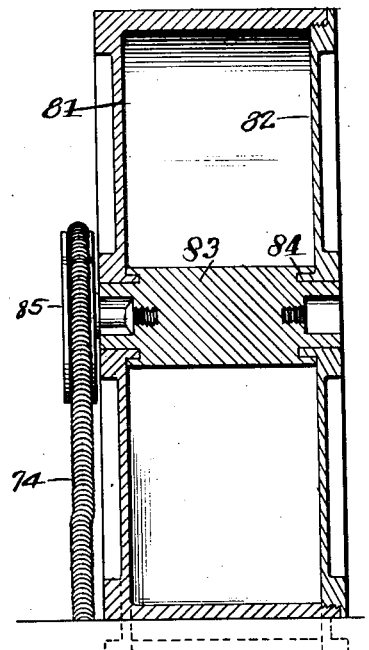

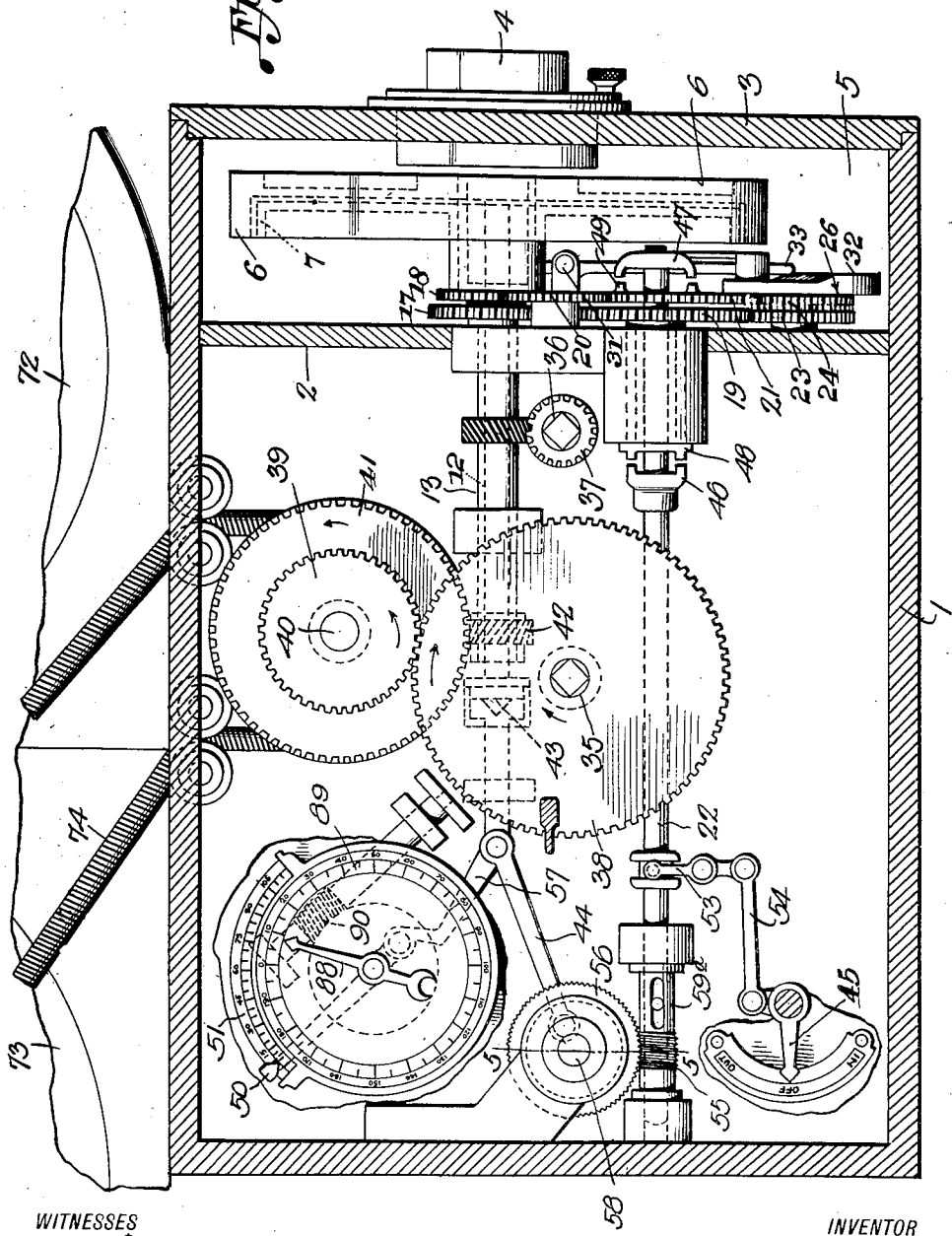

L. S. UHLER.
MOTION PICTURE CAMERA.
APPLICATION FILED JAN. 19, 1920.

1,409,980.

Patented Mar. 21, 1922.

WITNESSES

INVENTOR
Louis S. Uhler
BY
ATTORNEYS

UNITED STATES PATENT OFFICE.

LOUIS STEVEN UHLER, OF DETROIT, MICHIGAN.

MOTION-PICTURE CAMERA.

1,409,980.  Specification of Letters Patent.  Patented Mar. 21, 1922.

Application filed January 19, 1920. Serial No. 352,247.

*To all whom it may concern:*

Be it known that I, LOUIS STEVEN UHLER, a citizen of the United States, and a resident of Detroit, in the county of Wayne and State of Michigan, have invented certain new and useful Improvements in Motion-Picture Cameras, of which the following is a specification.

My invention relates to improvements in cameras, it being more particularly an improvement in motion picture cameras, and it consists in the constructions, combinations and arrangements herein described and claimed.

One of the foremost objects of the invention is to provide a motion picture camera whereby exposures can be made either at the ordinary rate of sixteen per second, or at the rate of only two exposures per second, the latter producing an artifice in the resultant exhibited picture, commonly known as a "trick" picture.

A further object of the invention is to provide means for automatically opening and closing the shutter to obtain an automatic dissolving action.

A further object of the invention is to provide means in said automatic dissolving mechanism, enabling the opening or closing of the shutter to any desired aperture, at the same time registering the size of the aperture by means of a scale and movable pointer within sight of the operator.

Other objects and advantages will appear in the following specification, reference being had to the accompanying drawings, in which:

Figure 1 is a side elevation of the improved motion picture camera,

Figure 2 is a detail side elevation of one of the film magazines,

Figure 8:
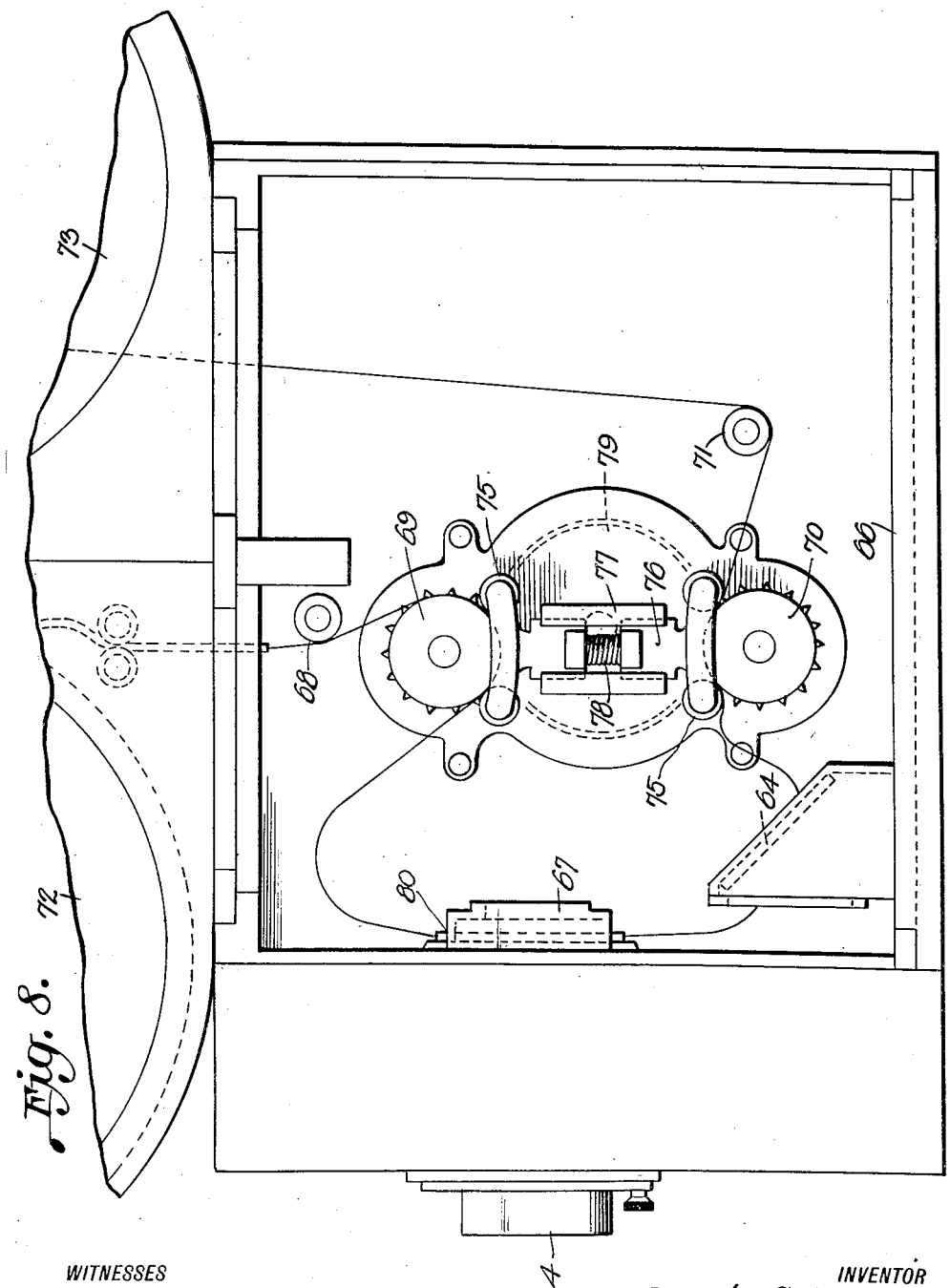

Figure 3 is a detail front elevation of the camera, the lens board and shutter being removed to show the mechanism in front of the partition referred to below, Figure 4 is a detail sectional view of one of the film magazines, this view being properly considered a continuation of the structure shown in section in Figure 3, Figure 5 is a detail sectional view of the means for setting the shutter aperture by hand, taken substantially on the line 5—5 of Figure 7, Figure 6 is a detail view showing the various parts of the shutter separated, Figure 7 is a longitudinal section of the camera taken substantially on the line 7—7 of Figure 3, and Figure 8 is a view of the camera taken from the other side, the hinged side of the camera box being opened toward the observer so as to reveal the film threading or guide mechanism.

The camera box 1 contains a partition 2 and has a removable lens board 3, on which the lens 4 of any desired type is mounted. The chamber 5 defined by the partition 2 and board 3, houses the shutter mechanism, which consists principally of the master and auxiliary shutter disks 6, 7, both of which have segmental apertures extending over 120 degrees.

Both disks are driven together, that is to say, as one, but are capable of relative adjustment so as to vary the size of the resultant apertures. To this end, the auxiliary disk 7 has a hub 8 with a longitudinal internal slot 9 in which the non-circular end 10 of the pin 11 fits. This pin is carried by the rod 12, which is either manually or automatically longitudinally adjustable in the shutter driving sleeve 13, the result of such adjustment of the rod being the relative circular adjustment of the two shutter disks, by virtue of the spiral slots 14 in the tubular hub 15 of the sleeve 13.

When the shutter parts are fitted together as in Figure 7, the hub 15 extends through the hub 8 of the auxiliary disk and also the hub 16 of the master disk, that hub being secured to the hub 15, the disk 7 and hub 8 however being loose on the hub 15 for the purpose of the relative circular adjustment spoken of above.

Pinions 17 and 18, fixed on the drive sleeve 13, respectively drive a gear 19 and an idler 20, the latter turning a gear 21 on the normally dormant dissolving shaft 22, on which both gears 19, 21 are loosely mounted. The rotation in opposite directions of the gears 19, 21 is the result of the arrangement in Figure 3, the gear 19 revolving in a counter-clockwise direction, while the gear 21 revolves in a clockwise direction, both in accordance with the arrows shown.

The gear 19 drives a pinion 23, which in turn drives a pinion of the same size 24 on the film advancer stub shaft 25, behind the advancer disk 26, which operates a suitably guided slide 27 through the connecting pitman 28.

On the upstroke of the pitman 28 the prongs 29 29 of the claw 30, which is pivoted at 31 on the slide 27, are free of the sprocket holes in the film directly behind the partition 2, but at the instant that the extremity of the upstroke is reached, the cam 32 of the disk 26 engages the extension 33 of the claw 30, so as to rock the prongs inwardly through the slot 34 thereby engaging the aforesaid sprocket holes and pulling the film down three-quarters of an inch on the subsequent return stroke of the pitman 28.

As clearly shown in Figure 8, the film is fed continuously so as to form a loop near the top of the box, from which loop the film is drawn by the successive pulling movements of the claw 30. There is also a loop near the bottom of the box, from which loop the film is drawn by the winding mechanism described below.

The drive mechanism of the sleeve 13 comprises a crank shaft 35 with a non-circular end, on which a suitable turning crank is fitted, when it is desired to operate the camera in the usual way, that is to say, to make sixteen exposures per second. When it is desired to make only two exposures per second, the handle or crank is taken off and put on the non-circular end of the crank shaft 36, whereupon the shutter drive sleeve is rotated by means of the intermeshing worm gears 37 clearly shown in Figure 7.

The main drive shaft 35 carries a gear 38, meshing with a pinion 39 on a belt shaft 40 which carries the worm or spiral gear 41, in turn driving the spiral pinion 42 on the shutter drive sleeve. Of necessity, the adjusting rod 12 must turn with the sleeve 13, and therefore it is necessary to provide the swivel connection 43 between the main part of the rod and its extension to which the link 44 of the dissolving mechanism is connected. On the outside of the camera box there is a plate with the legends "In", "Off" and "Out." When the pointer 45 points to "Off," the "In" and "Out" clutches 46, 47 are disengaged from the respective clutch elements 48, 49 respectively carried by the gears 19 and 21.

Consider the 120 degree openings of the master and auxiliary shutter disks 6, 7 as being remote from each other, and the shutter aperture therefore as being closed. The pointer 50 of the aperture register, so indicates on the scale 51. To produce an aperture in the shutter, the knob 52 on the outside in Figure 1, is turned so that the pointer 45 points to "In", by which act the shifting lever 53 is rocked through the link 54 so that the dissolving shaft 22 moves toward the right and the clutch elements 46, 48 are brought into engagement.

The gear 19 now turns the shaft 22 toward the left so that the screw 55 moves the gear 56 toward the right and causes the link 44 to pull the rod 12 outwardly, at the same time moving the pointer 50 over the scale 51 by virtue of the connection 57. The operator must watch the pointer 50 and when he sees that the proper indication on the scale 51 is reached, he moves the knob 52 back so that the pointer 45 points to "Off," thereby stopping further opening of the shutter.

Assume that the shutter has been opened 60 degrees. The link 44 will stand in approximately a mid position between the normal position shown in Figure 7 and the extreme position at the other side of the manual adjusting shaft 58. In order to again close the shutter so as to obtain the dissolving effect, the pointer 45 is moved to "Out", whereupon the shaft 22 is shifted toward the left and the clutch elements 47, 49 made to engage.

A right hand rotation is imparted to the shaft 22, consequently a left hand rotation to the gear 56, so that the link 44 is caused to move the adjusting rod 12 toward the right, thereby closing the shutter through the pin and eccentric slot arrangement in Figure 6, and moving the pointer 50 back to zero. It is to be observed that the screw 55 is carried by a sleeve 59$^a$ which has a pin and slot connection with the shaft 22, as is of course required because of the necessity of shifting movement of the shaft as explained above.

Manual adjustments of the shutter are produced by pulling the knob 59 out against the tension of the spring 60 in Figure 5, whereupon the toothed disks 61, 62 are separated, permitting turning of the shaft 58 through the remaining stem connections 63. It is to be observed that when the knob 59 is in the innermost position, all of the parts are locked together, no turning of the knob 59 being possible because the gear 56 cannot be turned against the driving screw 55.

But when the knob 59 is pulled out, the driving connection between the shaft portion of the knob and the manual shaft 58, still remains, thus making it possible to manipulate the link 44 and adjusting shaft 12 as already pointed out. In the event that manual adjustments of the shutter are made, the operator watches the pointer 50 as before, so as to accurately follow the size of the shutter aperture he is producing by manipulation of the knob.

Focusing is accomplished by observing the image in the suitably disposed mirror 64 through the lens 65, both of which are carried by the hinged side 66, which is shown down in Figure 8. When the side 66 is closed, the mirror 64 comes behind the film guide 67, which is mounted behind the partition 2 in registration with the exposure aperture 68 between the prong slots 34 in Figure 3. The focusing aperture is closed by a suitable gate 69, which normally excludes the light.

The film can easily be seen through, when focusing as pointed out above, the image on the mirror 64 being magnified by the lens 65. Of course that part of the film which is focused through will be spoiled, but since this covers only an inch or so of the film, the slight spoiling is of no consequence.

Threading the film through the camera in order to make the exposures, is accomplished by carrying the film over the guide 68, the sprocket 69, through the exposure gate 67, over the lower sprocket 70 and over the lower guide roll 71. The magazine 72 contains the unexposed film, while the magazine 73 contains the exposed film, the latter being driven by the spring belt 74 from the belt shaft 40.

The film is held in contact with the sprockets 69, 70 by rolls 75, which have extensions 76 occupying guides 77, between which a spring 78 is located, for the purpose of pressing the rolls into engagement with the respective sprockets. The sprockets are driven from the crank shaft 35 by means of a gear 79 which meshes with smaller gears on the respective sprocket shafts.

A presser plate 80 keeps the film in firm contact with the aperture of the film gate 67. It is to be observed in Figure 4, that the film magazine there shown comprises a casing 81, with a side 82 which is screwed in place, and so arranged that a light-tight joint between the spool 83 and side 82 is produced at 84 when the latter is screwed in place.

The same arrangement obtains on the other side, this arrangement consisting of a flange which fits into a circular groove on the spool. The ends of the spool have bores and screw-threaded counter bores, into which the fastening thumb screw 85 is screwed in mounting the spool.

Each film magazine is interchangeable with the other, it being possible to mount the driving pulley 86 on the right side of the casing 81 in Figure 4, when that casing takes the place of the other magazine and consequently is turned around in the other position. As clearly shown in Figure 2, the magazine 72 includes a grooved extension 87, by means of which a light-tight joint with the top of the camera box is obtained.

In order to register the number of feet of film used, a suitably driven pointer 88 is provided as clearly shown in Figures 1 and 7. This pointer moves over the scale 89, and is driven by spiral gear connections 90 from any suitable part of the mechanism, such driving connection being omitted in the illustration.

While the construction and arrangement of the improved moving picture camera as herein described and claimed, is that of a generally preferred form, obviously modifications and changes may be made without departing from the spirit of the invention or the scope of the claims.

I claim:—

1. Automatic dissolving means for motion picture cameras, comprising a normally stationary dissolving shaft with separated clutch elements, oppositely rotating gears on the shaft, each with a clutch element normally disengaged; uni-rotating superimposedly apertured shutter disks with means oppositedly rotating said gears, and means manually movable to engage either set of clutch elements, rotating the dissolving shaft accordingly and causing circular adjustment of one disk relative to the other for the gradual closing of the shutter aperture.

2. Automatic dissolving means for motion picture cameras, comprising uni-revolving shutter disks with coincident openings forming the aperture, spiral slots and pin connections, the latter on a rod which is axially movable, a dissolving shaft with screw, gear and link connections to the rod, and means for axially shifting the dissolving shaft in one direction to obtain rotation in one direction, cause axial movement of the rod from a previously obtained relative location of the link and gear, and thereby circularly adjust one disk relative to the other by virtue of the spiral slot and pin, and gradually close the aperture.

3. Automatic dissolving means for motion picture cameras, comprising uni-revolving shutter disks with coincident openings forming the aperture, spiral slots and pin connections, the latter on a rod which is axially movable, a dissolving shaft with screw, gear and link connections to the rod, means for axially shifting the dissolving shaft in one direction to obtain rotation in one direction, cause axial movement of the rod from a previously obtained relative location of the link and gear, and thereby circularly adjust one disk relative to the other by virtue of the spiral slot and pin, and gradually close the aperture, and indicator means associated with the shaft for designating various degrees of shutter aperture.

4. The combination in automatic disssolving means of a motion picture camera, of a shutter adjusting rod with a link, a normally stationary dissolving shaft with a worm, a gear with which the worm meshes and with which the link is operatively associated; right or left-hand rotating means, and manually actuated means shifting the shaft axially into operative engagement with said right or left hand rotating means, thereby axially shifting the rod in either of two directions accordingly.

5. The combination in automatic dissolving means of a motion picture camera, of a shutter adjusting rod with a link, a normally stationary dissolving shaft with a worm, a gear with which the worm meshes and with which the link is operatively associated; right or left hand rotating means, manually actuated means shifting the shaft axially into operative engagement with said right or left hand rotating means, thereby axially shifting the rod in either of two directions accordingly, and a fixed graduated scale with a pointer movable by the rod to indicate the degrees of rod movement.

6. The combination in automatic dissolving means of a motion picture camera, of a normally stationary dissolving shaft, and an adjacent shutter gear train, a gear driving worm sleeve on the shaft with a pin and slot connection thereto, and a knob with connections to the shaft for axially shifting it into right or left hand driving engagement with said gear train.

7. The combination in automatic dissolving means of a motion picture camera, of a normally stationary dissolving shaft, and an adjacent shutter gear train, a gear driving worm sleeve on the shaft with a pin and slot connection thereto, a knob with connections to the shaft for axially shifting it into right or left hand driving engagement with said gear train, and a movable pointer with a fixed scale, designating the extreme and intermediately shifted positions of the shaft.

8. The combination in automatic dissolving means, of a gear with an operatively associated link, a dual directionally revoluble worm pinion for mechanically rotating the gear in either direction, and a spring-held but manually extensible knob with connections normally preventing manual moving of the link, but having other connections enabling moving of said link independently of the pinion and gear, when pulled out and turned.

9. The combination in shutter adjusting means, of a studded stem with an eccentrically connected reciprocable link, a dual directionally mechanically driven gear with a portion carrying the stem and having teeth, and an externally accessible knob with a stem having a toothed portion spring pressed into said teeth, and so normally preventing link reciprocation by virtue of the gear connections, but capable of being pulled out to turn the stem relatively to said gear by virtue of the remaining stud connection with the knob toothed portion.

LOUIS STEVEN UHLER.